Patented July 8, 1952

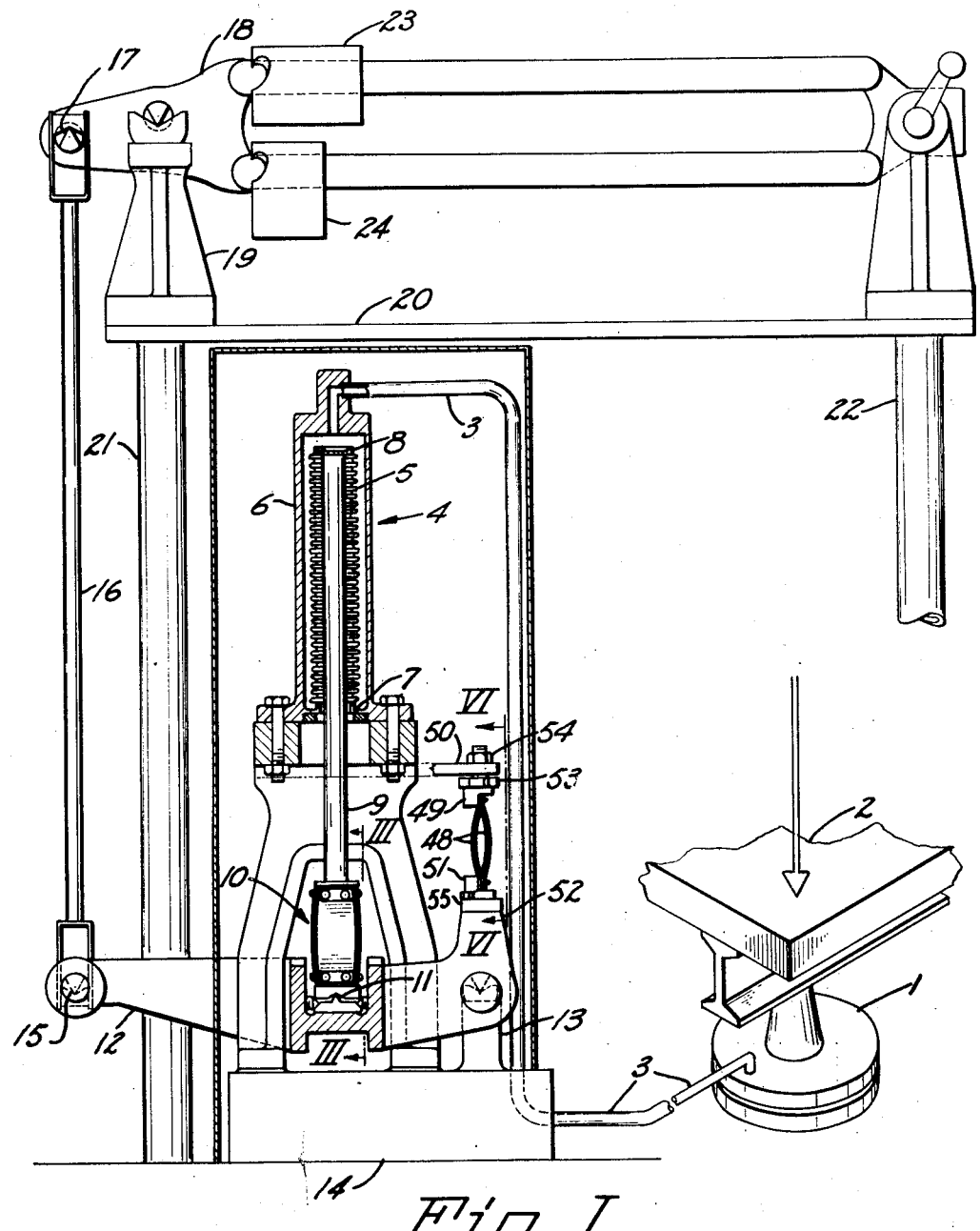
Fig. I
July 8, 1952 — L. S. WILLIAMS — 2,602,658
HYDRAULIC WEIGHING SCALE PRESSURE RECEIVER
Filed Nov. 9, 1949 — 3 Sheets-Sheet 1
Inventor
Lawrence S. Williams
Marshall, Marshall & Leonard
Attorneys July 8, 1952 L. S. WILLIAMS 2,602,658
HYDRAULIC WEIGHING SCALE PRESSURE RECEIVER
Filed Nov. 9, 1949 3 Sheets-Sheet 2
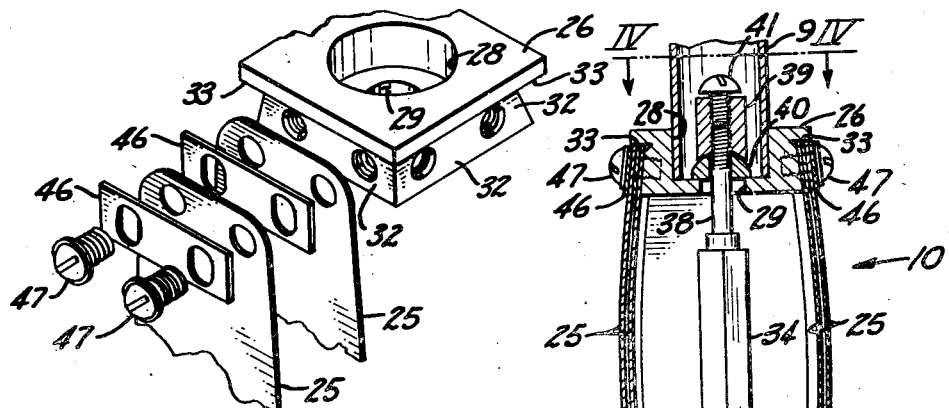
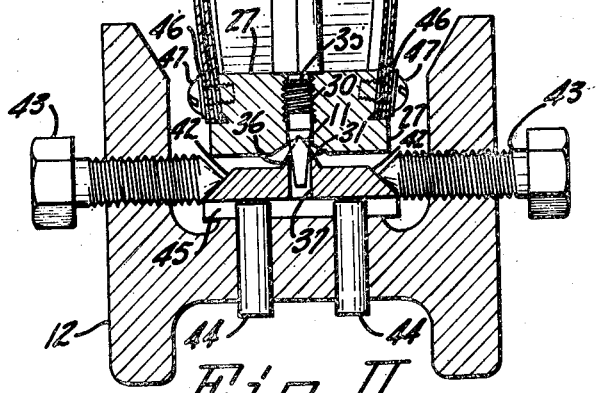
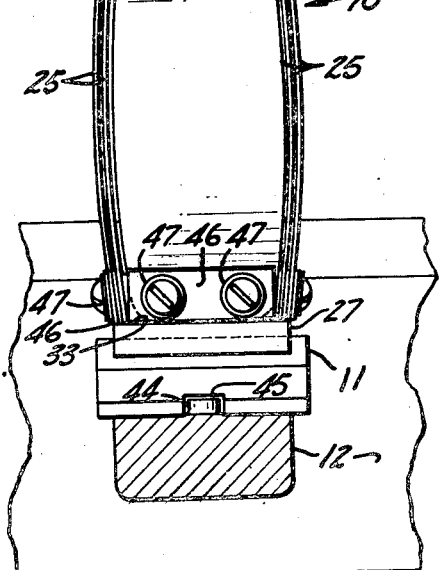
Inventor
Lawrence S. Williams
By Marshall, Marshall & Leonard
Attorneys

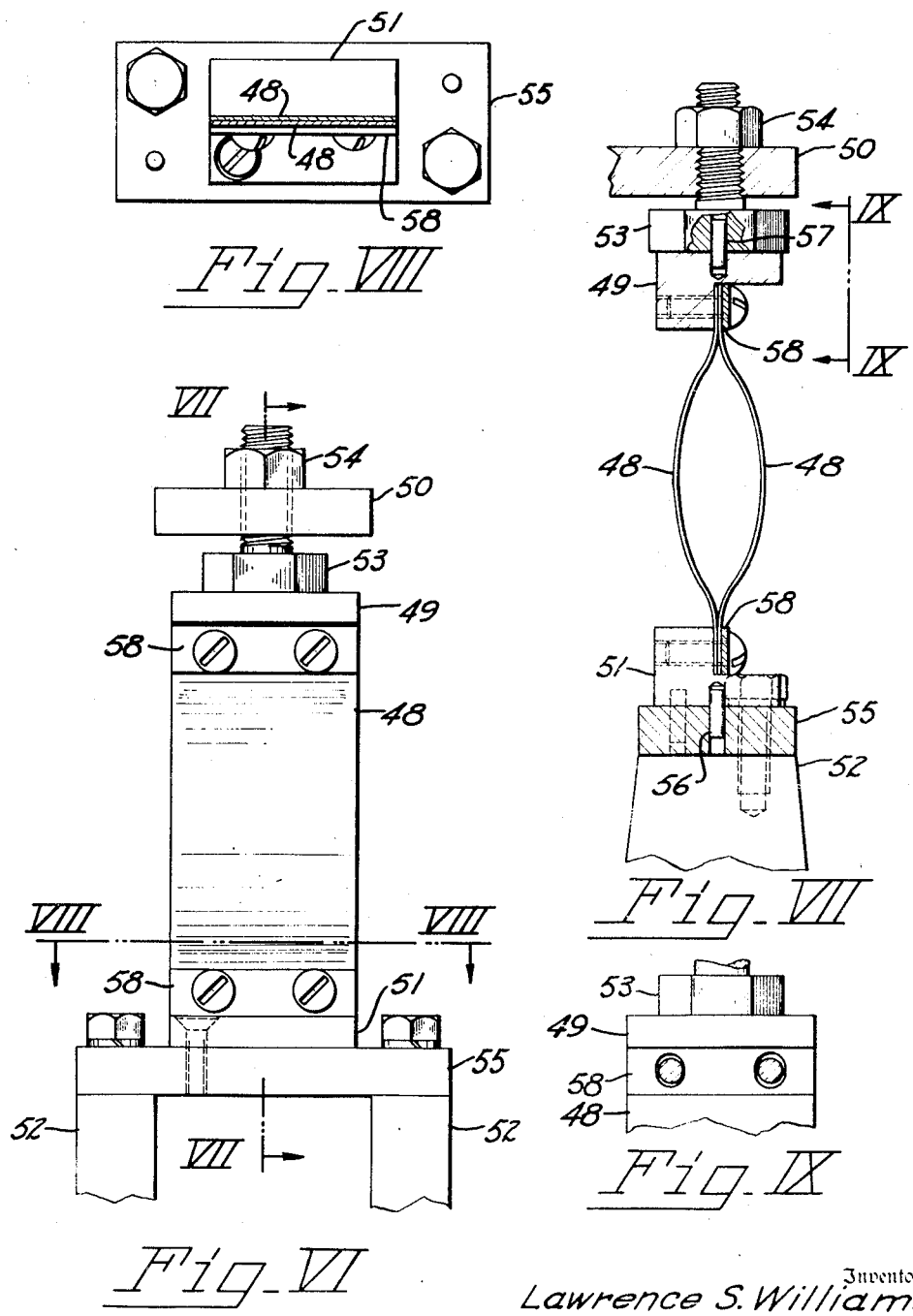

2,602,658

UNITED STATES PATENT OFFICE 2,602,658

HYDRAULIC WEIGHING SCALE PRESSURE RECEIVER

Lawrence S. Williams, Toledo, Ohio, assignor to Toledo Scale Company, Toledo, Ohio, a corporation of New Jersey Application November 9, 1949, Serial No. 126,401

10 Claims. (Cl. 265—47)

This invention relates to variable rate springs and in particular to a hydraulic pressure to force translating mechanism having improved structure for minimizing non-linear errors in force transmission of bellows used as hydraulic pressure receiving units.

A hydraulic weighing scale comprises a load receiver supported on one or more hydraulic systems including capsules that transform the load forces into hydraulic pressure in the hydraulic system or systems. The hydraulic pressure or pressures are then measured by pressure receiving units that convert the hydraulic pressure to mechanical force that is applied to conventional weighing scale equipment embodying either beam, spring, or pendulum counterbalancing mechanism.

In order that conventional weighing equipment may be used it is necessary that the force exerted by the hydraulic pressure acting through the pressure receivers shall be precisely proportional to the load forces applied to the load receiver. Hydraulic capsules or pressure transmitting units may be constructed to provide highly accurate force to pressure translation ratios as well as extremely small inherent load counterbalancing effects so that the hydraulic pressure is an accurate indication of the load force. Equally accurate pressure receiving units are not available. As far as is now known a corrugated metal bellows installed in a chamber and having the hydraulic pressure applied to its exterior surface is the most practical form of pressure receiver. Such a bellows, however, exhibits apparent changes in effective area and spring rate as the pressure applied to it is varied. It is believed that these observed errors are caused by the deformation of the individual corrugations of the metal bellows and that the deformations, by varying the shape of the folds of the bellows, introduce elastic forces tending to vary the length of the bellows as well as to change its characteristics as a spring.

These changes, producing errors in force transmission, are not linear functions of the load being weighed and therefore cannot be corrected by adjustment of the load counterbalancing mechanism itself. Even if these errors were of a nature that they could be compensated in the counterbalancing mechanism such would not be a satisfactory solution because, in any weighing scale employing a number of force transmission paths from the load receiver to the load counterbalancing mechanism (e. g., the several levers supporting the platform of a lever scale or the plurality of capsules supporting the platform of a hydraulic scale), it is necessary that the force transmission ratio of all of the paths be equal or the indicated load will vary according to the position of the load on the load receiver. It is therefore necessary that any corrective devices that are employed to correct errors in ratio of the respective hydraulic systems must act individually in the respective force transmitting systems and correct the error in that particular system.

It has been found that the error exhibited by a corrugated metal bellows having hydraulic pressure applied to its exterior surface may be corrected by employing an elastically compressible strut between the force transmitting end of the bellows and the lever or other load counterbalancing mechanism. If the compression characteristics of the elastically compressible strut are properly selected the resulting decrease in length of the bellows itself as the load is varied will cause sufficient force to be transmitted through the bellows walls acting as a spring to correct the observed errors in force transmission and cause the force applied to the load counterbalancing mechanism to be precisely proportional to the load being weighed. It has further been observed that a strut having a spring rate that decreases with an increase in load provides the desired correction.

The principal object of this invention is to provide a corrective device for the bellows of a hydraulic pressure receiver which device is simple to construct and capable of yielding to the extent required to correct the error of a relatively long corrugated metal bellows.

A further object of the invention is to provide in the strut a corrective device comprising a plurality of eccentrically loaded thin metal columns.

A further object of the invention is to provide, in the strut of a hydraulic pressure receiver, column mounting blocks shaped to provide some initial deflection of the columns.

A still further object of the invention is to provide a plurality of flat plates each acting as a column in supporting load and each acting as a brace to prevent the column as a whole from collapsing sidewise.

A still further object of the invention is to provide means for applying an initial load to the columns to control their deflection when the force transmitted through the bellows system is small.

An ancillary object of the invention is to provide a variable rate spring comprising one or more thin metal plates loaded as a column and stressed approximately to its point of instability for applying a substantially constant load throughout a range of deflections.

More specific objects and advantages are apparent from the following description of a hydraulic weighing scale embodying corrective devices constructed according to the invention.

According to the invention a plurality of metal plates each acting as a spring are eccentrically loaded as columns and stressed to produce deflection intermediate the ends of the springs in a direction normal to the applied force. The plates acting as columns or springs are worked in the deflection range wherein the yield in the direction of the applied force increases at an increasing rate with the magnitude of the applied load. The phrase "increases at an increasing rate" means that the increments of force applied along the length of the columns to produce equal increments of shortening of the columns decrease as the magnitude of the force increases. This increase in rate of the yield of the columns with increase in load permits corresponding shortening of the bellows so that some of the force from the hydraulic pressure acting against the closed end of the bellows is offset by the elastic resistance to deformation of the bellows walls themselves while the remaining component of force from the hydraulic pressure is transmitted through the strut to the load counterbalancing mechanism. The remaining component is very nearly proportional to the hydraulic pressure applied to the bellows.

The invention further contemplates in a broader scope the provision of a variable rate spring comprising one or more metal plates eccentrically loaded as columns and worked in the range wherein extremely large increments of deflection are obtained for small increments of load. When employed under these conditions the eccentrically loaded columns become the equivalent of dead weight in applying initial loads and may be used as rough standards of weight since the applied force is, over a considerable range, independent of the actual deflection of the column. In the structure illustrated in the drawings a pair of flat springs are stressed as columns to act between a fixed point and a point on the weighing scale lever in line with the fulcrum of the lever and the fixed point and located approximately midway therebetween. In this arrangement the eccentrically loaded spring columns supply a substantially constant force against the lever and by change in effective moment arm as the lever oscillates apply an overturning moment to the lever that is proportional to the deflection of the lever from its neutral position. In the illustrated weighing scale this overturning moment is employed to cancel the linear spring effect of the bellows and thus increase the sensitivity of the load counterbalancing system.

The invention further contemplates that the characteristics of the eccentrically loaded columns be controlled by adjustment of the effective length of the spring plates forming the columns and control of the angle between the ends of the columns and the axis of the strut.

A hydraulic pressure receiving system employing eccentrically loaded spring plate columns is illustrated in the accompanying drawings.

In the drawings:

Figure I is a front elevation, partly in section, of a hydraulic pressure receiving and counterbalancing mechanism and a simplified isometric view of a corner of a load receiver and a hydraulic capsule supporting the corner and transmitting pressure to the pressure receiver.

Figure II is an enlarged fragmentary section of a portion of the lever to which force is applied, and the spring plate correctors included in the strut from the pressure receiver bellows.

Figure III is an elevation taken substantially along the line III—III of Figure I.

Figure IV is a fragmentary plan view of the upper spring column mounting as seen from the line IV—IV of Figure II.

Figure V is a perspective exploded illustration of the construction at one end of the spring plate columns.

Figure VI is an enlarged fragmentary elevation taken along the line VI—VI of Figure I.

Figure VII is a vertical section taken along the line VII—VII of Figure VI.

Figure VIII is a horizontal section taken along the line VIII—VIII of Figure VI.

Figure IX is a fragmentary elevation taken substantially along the line IX—IX of Figure VII.

These specific figures and the accompanying description are intended merely to illustrate the invention and not to limit its scope.

In a hydraulic weighing scale hydraulic capsules 1 (one being shown in the figure) jointly support a load receiver 2 and convert the forces applied to the load receiver 2 into hydraulic pressure that is transmitted through connecting pipes 3 to pressure receivers 4 forming part of the load counterbalancing and indicating mechanism of the weighing scale. In each hydraulic system the hydraulic pressure transmitted through the pipe 3 acts on the exterior of a corrugated metal bellows 5 that is enclosed within a bellows chamber 6. To provide accurate weighing there is a pipe 3, a bellows 5 and chamber 6 with the associated equipment for each of the capsules 1 supporting the load receiver 2. Thus depending upon the design of the scale there may be four, six or eight or more capsules and pressure receivers.

The bellows 5 at its lower end is equipped with fittings 7 by means of which it is sealed into the opening at the bottom of the housing 6. The upper end of the bellows 5 is provided with a cap 8 that rests against the upper end of a strut 9 the lower end of which is supported on a corrective spring column assembly 10 which transmits force from the strut to a knife edge 11 adjustably mounted in a gathering lever 12. The lever 12 is fulcrumed on pedestals 13 erected from a base 14. A power pivot 15 of the lever 12 is connected through a steelyard 16 to a load pivot 17 of a load counterbalancing beam 18 fulcrumed on a fulcrum stand 19 erected from a bench 20 which, in turn, is supported on stanchions 21 and 22. Poises 23 and 24 mounted on the beam 18 serve to counterbalance applied loads and in cooperation with indicia on the beams indicate the magnitude of the load.

The gathering lever 12 has a load pivot 11 for each of the pressure receivers 4 employed in the scale and serves to combine the forces from the several pressure transmitting systems into a single force, representative of the load, which is counterbalanced by the weigh beam 18.

The long, corrugated metal bellows 5 and the strut 9 tend to assume the position shown in the drawing and to resist lateral deflection with a force that is proportional to the hydraulic pressure applied to the pressure receiver. The inherent stability of this arrangement results from the fact that when hydraulic pressure is applied to the upper end of the bellows 5 it tends to shorten its length and thus behaves as a tension member or link applying force against the end of the strut. Since the length of the bellows is much less than the length of the strut any lateral displacement of the upper end of the bellows and strut results in a stretching of the bellows and thus is resisted by the tendency of the bellows to contract under applied pressure. Thus the bellows and strut are in stable equilibrium regardless of the magnitude of the applied pressure.

It was mentioned earlier that the bellows exhibits a non-linear error in force transmission as the magnitude of the force being transmitted is varied. This error is not in direct proportion to the transmitted force and therefore cannot be fully corrected by a change in lever ratio. The error is corrected by adjusting the lever ratio of the system as by adjusting the position of the knife edge 11 until the scale indicates correctly at zero and at approximately ¼ or ⅓ of its normal weighing capacity. With this adjustment the indicated load at greater loads is more than the actual load on the platform with the magnitude of the error increasing at an increasing rate. It is therefore necessary in correcting this condition to allow the bellows 5 to shorten at an increasing rate as the load is increased so that the elastic resistance to deformation of the bellows walls provides a force acting against the cap 8 of the bellows 5 to support part of the hydraulic pressure. The remainder of the pressure force acting through the strut applies the proper force to the lever 12. It is the purpose of the spring plate column structure 10, forming the compensator, to permit such shortening of the bellows by shortening the length of the strut 9 according to load.

While other means of providing a non-linear shortening of the bellows are known they are not as satisfactory nor can they accommodate the magnitude of deflection required to secure the desired change in length of the bellows.

The improved corrector device 10 is shown in detail in Figure II. This corrector device comprises a plurality of sheet metal springs 25 that are attached to upper and lower mounting blocks 26 and 27. The upper mounting block 26 (see also Figure V) has a counterbore 28 in its upper surface to receive the lower end of the strut 9. The strut 9 is preferably in the form of a tube. The upper block 26 also has a clearance hole 29 in axial alignment with the counterbore 27.

The lower mounting block 27 has a threaded hole 30 extending axially therethrough and in its lower surface is provided with a V-groove 31 that receives the load knife edge 11 of the lever 12. The sides of the mounting blocks 26 and 27 are machined to provide clamping surfaces 32 against which the end marginal surfaces of the spring plates 25 are clamped and ledges 33 against which the ends of the spring plates rest. The clamping surfaces 32 are machined at a slight angle (in the neighborhood of 10 to 12 degrees) with respect to the axis of the assembly so that when the spring plates 25 are clamped thereto the plates are bowed approximately to the shape shown in Figures II and III. This initial bowing of the spring plates 25, serving as eccentrically loaded columns, determines to a large extent the magnitude of the load that must be applied to the correctors before appreciable deflection occurs. After a deflection corresponding generally to that shown is obtained the force required to produce additional deflection increases at a decreasing rate but does not reverse until appreciably greater deflection is obtained.

Since no correction is required throughout the first quarter or third of the weighing range a preloading post 34 is included in the assembly. The post 34 has on its lower end a threaded stem 35 that is threaded through the hole 30 and that has a tapered tip 36 fitting loosely in a hole 37 drilled through the knife edge 11 normal to the knife edge. The sides of the tapered tip 36 serve as thrust faces to cooperate with the corners of the knife edge 11 to prevent movement of the lower mounting block 27 along the length of the knife edge 11. The upper end of the post 34 has a reduced diameter section 38 that extends upwardly through the clearance hole 28 and into the lower end of the strut 9. The upper end of the stem 38 is threaded to receive a cupped nut 39, the cupped end of which bears on a hemispherical washer 40 slipped over the threaded end of the stem 38 and which bears against the bottom of the counterbore 28 in the upper mounting block 26. A screw 41 threaded into the upper end of the nut 39 and jammed against the end of the stem 38 serves to lock the nut in adjusted position. The post 34 and the adjusting nut 39 are employed to select the initial or pre-load height of the column.

The block containing the knife edge 11 has beveled ends 42 that are engaged by cone-pointed lock screws 43 threaded through upstanding ribs of the gathering lever 12. Adjustment of the locking screws 43 serves to position the knife edge containing block along the pivot line of the lever. Its alignment during adjustment is maintained by a pair of pins 44 set into the lever 12 and engaging a slot 45 cut in the bottom of the knife edge containing block. While in Figure II considerable clearance is shown between the pins 44 and the sides of the slot or groove 45, actually these members are made to very close tolerances so that the alignment of the knife edge with respect to the pivoting axis of the lever is accurately maintained.

Referring to Figures II and III it is pointed out that the spring plates 25 forming the eccentrically loaded columns are in fact thin plates which are barrel-shaped in outline. This particular shape is selected to secure substantially uniform maximum fiber stress in bending throughout the length of the columns and thus make most economical use of the quantity of spring material employed in the plates. It will also be noted from these figures that in the particular example shown the plates are arranged as the sides of a four-sided polygonal structure and that two such plates effectively in parallel are included in each side of the structure.

This is the preferred construction as being the simplest to construct and is intended to serve as the preferred example of a polygonal structural form having one or more spring column plates attached to each of the several sides of the polygonal form. While from a consideration of vertical forces only the number of sides of the polygonal form can be increased indefinitely, the requirement of lateral stability limits the number of sides that may be employed to a relatively low number. In the structure shown this stability is secured by the relatively great width of each of the plates, this width serving to prevent any lateral buckling of the strut and compensating unit. As the number of sides are increased, the width of each decreases and the stability against lateral buckling also decreases. The preferred form of construction is that shown in the drawings and comprising square mounting blocks with the spring plates attached to their four sides.

Figure V illustrates the assembly of the spring plates 25 to the upper mounting block 26 and also shows spacers 46 that are interposed between the plates and between the heads of screws 47 and the outer plate. These spacers have slotted openings so that they may be adjusted longitudinally of the spring plates 25 and thus vary the effective or free length of the plates. It is not necessary that the plates be clamped all the way to the edge of the spacers 46 inasmuch as the plates deflect in only the direction in which the spacers 46 offer support. Regardless of the adjustment of the spacers 46 the ends of the spring plate columns 25 bear against the surfaces 33 of the mounting blocks.

The decreasing rate, the decrease in the increments of force required to produce uniform increments of deflection as the load increases, is a result of the deflection of the spring plates 25 normal to the direction of the applied force. Since this deflection in the normal direction is in the nature of a toggle motion and is resisted only by bending forces in the strips themselves it follows that the increased moment arms resulting from the increased lateral deflection contributes nearly as much to the bending moment in the deflected position as does the increased load. In fact a particular range of adjustment may be found wherein the increased bending moment resulting from the lateral deflection of the springs increases rapidly enough to overcome the resisting bending moment of the strips. Under this condition the sustaining force of the springs acting as columns is substantially constant over a wide range of deflections. However when the elements are used as a corrector for a hydraulic weighing scale bellows they are not stressed highly enough to produce this tendency toward instability.

This type of construction by proper selection of the thickness and strength of the spring plates 25, their length, and the angles at which their ends are held, makes possible the construction of a compensating unit that very closely matches and compensates for the errors observed in the hydraulic pressure to force translation characteristic of a corrugated, thin metal bellows. Specific dimensions for the component parts of the correcting device 10 are selected according to the measured characteristics of the bellows with which it is to cooperate. It may be observed however that the spring plates 25 must not be too long or they become quite unstable nor may they be so short that the device has practically no range of deflection. Of most interest in the design for a compensator however is the angle at which the strips are held in the mounting blocks 26 and 27. If the strips are held parallel with the axis of the device they support a large load before they start to yield but once they start they are immediately unstable and continue to deflect laterally until the load is relieved. However introducing initial bending stress by means of the angle at which the strips are clamped reduces the force required to produce the initial deflection of the springs and thus tends to make a much more satisfactory structure. The "slenderness ratio" criteria applied to columns generally also applies to these columns in that their length must not be so great in respect to their cross section that they become unstable for any load.

A pair of spring plates 25 are shown on each of the four sides of the correcting device 10. A pair of springs is preferred over a single spring having the same strength because the unit stresses in the multiple springs is lower than those in a single spring of the same strength. Because of this reduction in unit stress the multiple spring arrangement has much greater life than a single spring construction having generally the same characteristics as far as deflection versus load is concerned.

Spring plates loaded as columns and allowed to deflect normal to the applied forces are also employed in the improved hydraulic pressure receiving and indicating mechanism for the purpose of overcoming or compensating for the spring effect of the hydraulic pressure receiving bellows and thus providing a more sensitive indication of variations in load. Referring to Figure I a pair of springs 48 loaded as columns and acting between a fixed mounting block 49 supported on a frame portion 50 and a second mounting block 51 supported on upstanding arms 52 of the lever 12 supply force of substantially constant magnitude along a line directed generally through a fulcrum axis of the lever 12. The point of attachment between the bowed spring plates 48 and the lever 12 is approximately half way between the fulcrum axis of the lever 12 and the point of fixed support for the bowed springs. As long as the lever 12 is in its neutral position the force is directed through the fulcrum axis of the lever and applies no turning moment thereto. However as soon as any movement of the lever away from this neutral position occurs the line of action of the force exerted by the bowed springs 48 no longer passes through the fulcrum axis but is displaced therefrom a distance generally equal to the movement of the lever from its neutral position. The spring force remains substantially constant but by acting at different moment arms produces a moment tending to accelerate the lever in whichever direction it has deflected with a moment force that is proportional to the deflection of the lever. Since the spring effect of the bellows themselves act to restore the lever to its neutral position and since the force from the bowed spring plates 48 acts to upset the lever it follows that these forces may be, by selection of proper sizes of the bowed springs 48, balanced against each other to provide substantially neutral equilibrium in the complete weighing scale system.

The detail of construction of the bowed springs 48 and their mountings are shown in Figures VI to IX inclusive. Figure VI in particular shows the end of the fixed support 50, the upper bowed spring support 49, an adjusting screw 53 that supports the upper mounting block 49 and a nut 54 that locks the adjusting screw 53 in position. This figure also shows the lower mounting block 51 as mounted on a cross piece 55 which is in turn secured to the upwardly directed arms 52 of the lever 12. These elements are also shown in Figure VII and in addition a locating pin 56 for locating the lower mounting block 51 with respect to the intermediate support member 55 and another pin 57 that serves to hold the upper mounting block 49 in central position on the face of the adjusting screw 53 are shown in the broken away sections.

The mounting of the lower mounting block 51 on the intermediate member 55 is also shown in plan in Figure VIII.

In end elevation, as seen in Figure VII, the mounting blocks 49 and 51 are L-shaped with the ends of the bowed springs 48 clamped between small clamp plates 58 and the vertical surfaces of the L-shaped blocks. At least one of the small clamping plates 58 has slotted holes so that some adjustment of the effective length of the bowed springs 48 may be secured.

The bowed springs 48 illustrate the use of column-like springs for applying a substantially constant force to a member. In this particular instance the force accomplishes two objectives in that it securely holds the fulcrum knife edges of the lever 12 in position on their bearings and at the same time supplies the force to produce the overturning moment that compensates for the spring effect of the bellows in the hydraulic pressure receiver. If the only function of the bowed springs 48 is to hold the fulcrum knife edges of the lever in place the springs may be designed for and loaded to their critical condition wherein small increments of force produce large increments of deflection. In the particular application illustrated this objective is relatively unimportant but the overturning moment produced by the force acting at variable moment arms must be balanced against the spring effect of the bellows. This is accomplished by adjustment of the screw 53 to change the working length of the bowed spring column and thus the magnitude of the force. This adjustment is easily accomplished since the upper mounting block 49 and the screw 53 are relatively rotatable, the pin 57 serving to prevent lateral misalignment of the members.

By forming the springs 48 with some initial curvature and by providing sufficient range of adjustment in the adjusting screw 53 it is possible to secure a wide range of adjustment of the overturning moment force and thus make it a relatively easy matter to match the spring rate of the bellows 5 and the counter spring effect of the bowed springs 48.

The various combinations of bowed springs employed as eccentrically loaded columns and the proper selection of starting angles for the springs as well as proper starting heights makes it possible to construct an accurate hydraulic pressure to force translating system which may then be combined with known hydraulic capsules to make an accurate hydraulic weighing scale.

Various modifications may be made in the structures illustrated to adapt these structures to similar uses without departing from the spirit and scope of the invention.

I claim:

1. An elastic device for exerting substantially constant force over a range of deflections, comprising a base member, an upper member, each of the members having a plurality of inclined side faces and a plurality of spring plate columns connecting said members and attached to the inclined side faces, said spring plate columns having when assembled an initial curvature that is increased upon addition of load to the members to decrease their ability to carry additional load.

2. An elastic device for correcting observed non-linear errors in force translation of an elastic corrugated metal bellows, said device comprising a plurality of spring plate columns included in a strut between the bellows and a force receiver, said columns being arranged as the sides of a polygonal structure and each having an initial curvature that increases with increase in load to shorten the effective length of the strut at an increasing rate with increase in load.

3. A hydraulic pressure to force translating device comprising, in combination, a bellows, a bellows chamber enclosing the bellows, said bellows being sealed to the chamber at the mouth of the chamber to receive fluid between the chamber and bellows, a cap at the other end of the bellows, a strut adapted to connect the cap to force measuring mechanism, and a plurality of spring plate columns arranged as the sides of a polygonal structure included in the strut, said columns each having initial curvature that increases with load and that serves to shorten the strut at an increasing rate with increase in load.

4. A hydraulic pressure to force translating device comprising, in combination, a bellows, a bellows chamber enclosing the bellows, said bellows being sealed to the chamber at the mouth of the chamber, a cap at the other end of the bellows, a strut operatively connected to the cap, and a plurality of spring plate columns operatively connected to the strut and adapted to transmit force from the strut to a force measuring mechanism, said spring plate columns being arranged as the sides of a polygonal structure and each having initial outward curvature that increases with load to shorten the column length at an increasing rate with an increase in load.

5. A hydraulic pressure to force translating device comprising, in combination, a bellows, a bellows chamber enclosing the bellows, said bellows being sealed to the chamber at the mouth of the chamber, a cap at the other end of the bellows, and a force transmission system comprising a strut operatively connected to the cap, a mounting block operatively attached to the strut, a second mounting block adapted to apply force to force measuring mechanism, and a plurality of spring plate columns arranged as the sides of a polygonal structure and attached to the mounting blocks to transmit force therebetween, said blocks having surfaces inclined to the axis of the strut to which surfaces the spring plate columns are clamped.

6. A hydraulic pressure to force translating device comprising, in combination, a bellows, a bellows chamber enclosing the bellows, said bellows being sealed to the chamber at the mouth of the chamber, a cap at the other end of the bellows, a strut operatively connected to the cap, a mounting plate operatively attached to the strut, a second mounting plate adapted to apply force to a force measuring mechanism, and a plurality of spring plate columns arranged as the sides of a regular polygonal structure and attached to the mounting blocks to transmit force therebetween and to yield at an increasing rate upon increase in load to effect corresponding shortening of the bellows while maintaining the alignment of the strut.

7. A hydraulic pressure to force translating device according to claim 6 in which the spring plate columns are arranged as the sides of a rectangular polygonal structure.

8. A hydraulic pressure to force translating device according to claim 6 in which the spring plate columns are arranged as the sides of a square polygonal structure.

9. A hydraulic pressure to force translating device comprising, in combination, a bellows for receiving the hydraulic pressure, a support for the bellows, a lever, force measuring mechanism operatively connected to the lever, means for operatively connecting the bellows to the lever, said lever having a fulcrum axis in fixed relation to the bellows support, and a bowed spring plate column that is attached to a portion of the lever remote from the fulcrum axis and to a fixed support that is in alignment with the undeflected position of said portion and the fulcrum axis and that exerts force as a column along a line normal to the fulcrum axis and displaced from the axis a distance proportional to the deflection of the lever from its neutral position.

10. In hydraulic pressure to force translating device, in combination, a load counterbalancing and indicating mechanism, a lever for transmitting force to the load counterbalancing mechanism, a bellows that is subjected to the hydraulic pressure, means for supporting the bellows, means for operatively connecting the bellows to the lever, said bellows exhibiting a spring effect opposing movement of the lever and load counterbalancing mechanism from a neutral position, and a bowed spring plate column that is attached to a fixed support and a portion of the lever intermediate the fixed support and the fulcrum axis of the lever and that exerts force against the lever with the line of action of the force of the column being normal to the fulcrum axis and displaced from the axis a distance proportional to the deflection of the lever from its neutral position.

LAWRENCE S. WILLIAMS.

REFERENCES CITED

The following references are of record in the file of this patent:

UNITED STATES PATENTS

| Number | Name | Date |
| --- | --- | --- |
| 805,720 | Fulton | Nov. 28, 1905 |
| 1,978,665 | Beecher | Oct. 30, 1934 |
| 2,057,576 | Johnson | Oct. 13, 1936 |
| 2,439,533 | Williams | Apr. 13, 1948 |